United States Patent [19]
Ohlmeyer et al.

[11] Patent Number: 4,810,476
[45] Date of Patent: Mar. 7, 1989

[54] PROCESS AND APPARATUS FOR CATALYTICALLY REDUCING NOXIOUS SUBSTANCES IN FLUE GAS

[75] Inventors: Manfred Ohlmeyer, Eggenstein-Leopoldshafen; Martin Benzel, Aachen, both of Fed. Rep. of Germany

[73] Assignee: Kernforschungszentrum Karlsruhe GmbH, Karlsruhe, Fed. Rep. of Germany

[21] Appl. No.: 117,309

[22] Filed: Nov. 6, 1987

[30] Foreign Application Priority Data

Nov. 6, 1986 [DE] Fed. Rep. of Germany ....... 3637871

[51] Int. Cl.$^4$ ............................................. B01D 53/36
[52] U.S. Cl. ................................... 423/239; 423/210; 423/244; 423/DIG. 13; 502/21
[58] Field of Search .... 423/239 A, DIG. 9, DIG. 13, 423/244 R, 210; 502/21

[56] References Cited

U.S. PATENT DOCUMENTS

| | | | |
|---|---|---|---|
| 2,353,119 | 7/1944 | Workman | 502/21 |
| 2,441,170 | 5/1948 | Rose et al. | 502/21 |
| 2,615,785 | 10/1952 | Jewell | 502/21 |
| 4,003,711 | 1/1977 | Hishinuma et al. | 423/239 A |
| 4,054,640 | 10/1977 | Iwata et al. | 423/239 A |
| 4,272,497 | 6/1981 | Takahashi et al. | 423/239 |
| 4,500,501 | 2/1985 | Hamada et al. | 423/239 A |
| 4,565,679 | 1/1986 | Michalak et al. | 423/239 A |
| 4,756,891 | 7/1988 | Ohlmeyer et al. | 423/235 |

FOREIGN PATENT DOCUMENTS

| | | |
|---|---|---|
| 3407277 | 2/1984 | Fed. Rep. of Germany . |
| 3505354 | 2/1987 | Fed. Rep. of Germany . |
| 3637871 | 3/1988 | Fed. Rep. of Germany . |
| 99077 | 8/1979 | Japan .................. 423/239 A |
| 193720 | 11/1983 | Japan .................. 423/239 A |

*Primary Examiner*—John Doll
*Assistant Examiner*—Jeffrey Edwin Russel
*Attorney, Agent, or Firm*—Spencer & Frank

[57] ABSTRACT

An apparatus and process for catalytically reducing noxious substances in flue gas wherein a heat exchanger is traversed from a top section to a bottom section by a plurality of heat storage elements which are separately movable and are charged by the flue gas transversely to their direction of movement. At least a portion of the heat storage elements are provided with a catalyst coating. Flue gas cooled downstream of a desulfurization system is conducted through the bottom section of the heat exchanger where it is preheated by the heat storage elements and is then heated to a predetermined reaction temperature by an external heating means. Ammonia is added and the flue gas is conducted at least once through at least one middle section of the heat exchanger for the catalytic reduction of the noxious substances. Then, the flue gas is conducted through the top section of the heat exchanger so as to cool it to a predetermined chimney entrance temperature. Not only is a decrease in catalytic activity prevented, but an adverse affect on the efficiency of the catalyst due to leakages from a gas preheater for the flue gas is prevented so that the heat exchanger can be used advantageously downstream of a desulfurization system.

6 Claims, 1 Drawing Sheet

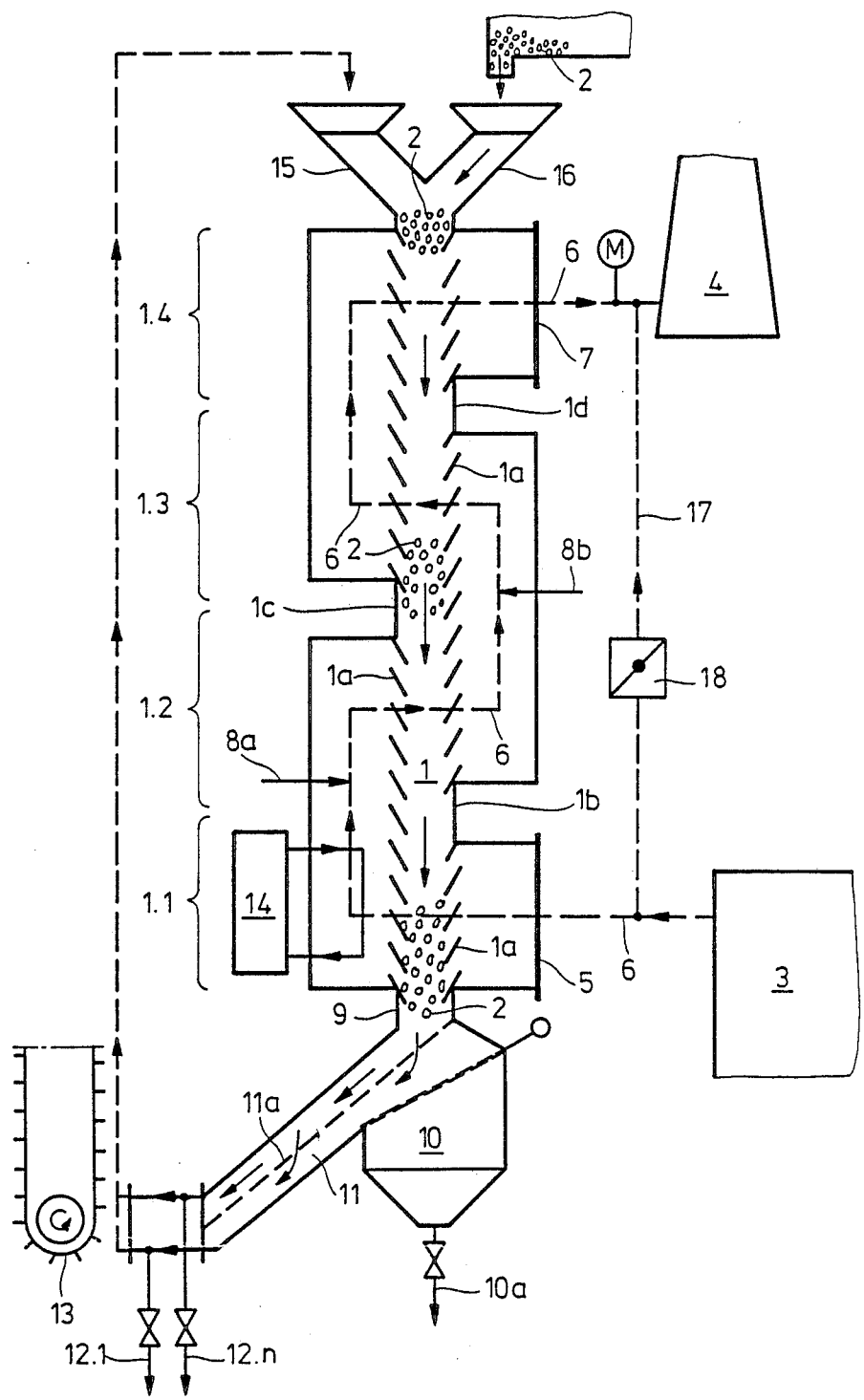

PROCESS AND APPARATUS FOR CATALYTICALLY REDUCING NOXIOUS SUBSTANCES IN FLUE GAS

This application is related to U.S. patent application Ser. No. 06/919/708 which was filed Oct. 16, 1986, now U.S. Pat. No. 4,756,891.

BACKGROUND OF THE INVENTION

1. Field of the Invention

This invention relates to a process and apparatus for catalytically reducing noxious substances in flue gas.

2. Description of the Related Art

German Pat. No. 3,536,958 which corresponds to U.S. application Ser. No. 06/919,708 (hereinafter referred to as the "prior Application" and the disclosure of which is herein incorporated by reference), now U.S. Pat. No. 4,756,891 relates to a method and apparatus for preheating combustion air and for catalytically reducing noxious substances in flue gas. The essential purpose of the invention disclosed therein is to prevent a decrease in catalytic activity during operation and to additionally reduce the space requirement of such systems by combining the catalyst and the preheater for the combustion air.

After leaving the apparatus, the flue gas is introduced into further purification stages, such as an electrofiltering apparatus and a flue gas desulfurization system. However, it is also known to perform flue gas desulfurization before catalytic reduction of the noxious substances as disclosed in German Published Application No. 3,407,277. This substantially protects the sensitive catalyst from sulfur compounds. To keep the required external energy for reheating the flue gas as low as possible, however, a regenerative gas preheater is connected in the circuit. Leakages from this regenerative gas preheater are known to adversely affect the efficiency of the catalyst and, thus, to require a corresponding enlargement of the quantity of catalyst because this preheater effects polluting the cleaned flue gas with uncleaned flue gas.

SUMMARY OF THE INVENTION

It is an object of the present invention to further improve the principle of the prior Application so that it can be used advantageously downstream of a desulfurization system wherein the flue gas is cooled and, additionally, so that leakages from a gas preheater, required for preheating of the flue gas, are avoided.

These and other objects of the invention are attained by a process for catalytically reducing noxious substances contained in flue gas which includes passing a plurality of heat storage elements which are separately movable in a direction of passage, for example, downwardly, through a top section, at least one middle section, and a bottom section of a heat exchanger, in the order recited, at least a portion of the plurality of heat storage elements being provided with a catalyst coating and being divided into a plurality of groups, each group of the plurality of groups differing from other groups of the plurality of groups in at least one significant characteristic, such as at least one physical characteristic selected from size, shape and weight, on the basis of which the plurality of groups may be separated from one another. Further, flue gas is passed through the heat exchanger in a direction transverse to the direction of passage of the heat storage elements by first conducting the flue gas discharged from and cooled within a desulfurization system through the bottom section of the heat exchanger to preheat the flue gas by contact thereof with the plurality of heat storage elements and to bring the flue gas to a predetermined reaction temperature by means of an external heating means. Second, ammonia is added to the flue gas and the flue gas is conducted through the at least one middle section of the heat exchanger at least once for catalytic reduction of the noxious substances by contact thereof with the catalyst coating provided on at least a portion of the plurality of heat storage elements. Third, the flue gas is conducted through the top section of the heat exchanger to cool the flue gas to a predetermined chimney entrance temperature by contact thereof with the plurality of heat storage elements. Finally, the plurality of heat storage elements is removed from the bottom portion of the heat exchanger and the plurality of heat storage elements are reintroduced into the top section of the heat exchanger, wherein the removing step includes disposing of at least one spent group of the plurality of groups of heat storage elements and substituting therefor at least one different and unspent or regenerated group of the plurality of groups of heat storage elements.

The disposing of spent heat storage elements and substituting therefor unspent or regenerated heat storage elements may be initiated by measuring noxious substance concentrations of, for example, $NO_x$ and $NH_3$, in the flue gas exiting the top section of the heat exchanger and causing disposing and substituting when the noxious substance concentrations exceed predetermined allowable noxious substance concentrations.

The removing step may include sorting the plurality of heat storage elements exiting the bottom section of the heat exchanger in a sorting means, such as a grate, to separate the plurality of groups from one another on the basis of the at least one significant characteristic.

The process may further include cleaning the plurality of heat storage elements removed from the bottom portion of the heat exchanger to remove dust and abrasion products therefrom.

The objects of the invention are also attained by an apparatus for catalytically reducing noxious substances in flue gas which includes a plurality of heat storage elements which are separately movable and at least a portion which are provided with a catalyst coating and are divided into a plurality of groups, each group of the plurality of groups differing from other groups of the plurality of groups in at least one significant characteristic, such as at least one physical characteristic selected from size, shape and weight, on the basis of which the plurality of groups may be separated from one another. A heat exchanger housing is provided having interconnected sections including a top section, at least one middle section, and a bottom section, and having gas-permeable interior walls provided to contain and permit the flow of the plurality of heat storage elements in a direction of passage, for example, downwardly, through the top section, the at least one middle section and the bottom section, in the order recited. Means connecting the bottom section of the heat exchanger housing to a source of flue gas and means connecting the top section of the heat exchanger housing to a chimney entrance are employed. Means for removing the plurality of heat storage elements from the bottom section of the heat exchanger housing and means for reintroducing the plurality of the heat storage elements into the top section of the heat exchanger housing are also employed, the means for removing including a discharge means operatively connected to the bottom section of the heat exchanger housing and sorting means for separating the plurality of groups from one another and operatively connected to the discharge means and to the means for reintroducing the plurality of heat storage elements into the top section of the heat exchanger housing.

The heat exchanger housing of the inventive apparatus repeatedly deflects the flow of flue gas such that the flue gas passes from the bottom section, through the at least one middle section, and through the top section in a direction which is transverse to the direction of passage of the plurality of heat storage elements. The bottom section of the heat exchanger housing is provided with external heating means downstream of the flue gas for heating the flue gas to a predetermined reaction temperature. The at least one middle section of the heat exchanger housing is provided with at least one means for dosaging ammonia therein for catalytic reduction of the noxious substances in the flue gas. The flue gas is cooled to a predetermined chimney entrance temperature in the top section of the heat exchanger housing.

The sorting means, such as a grate, separates the plurality of groups of heat storage elements from one another on the basis of the at least one significant characteristic which is a physical characteristic selected from size, shape and weight. The plurality of heat storage elements preferably have a spherical shape.

The apparatus may further include means for disposing of at least one spent group of the plurality of groups of heat storage elements and substituting therefor at least one different and unspent or regenerated group of the plurality of groups of heat storage elements. The apparatus may further include means for measuring noxious substance concentrations of the flue gas exiting the top section of the heat exchanger and means for causing disposing and substituting of the at least one spent group when the noxious substance concentrations exceed predetermined allowable noxious substance concentrations.

The discharge means may include means for cleaning the plurality of heat storage elements to remove dust and abrasion products therefrom, such as, a brush.

As for the prior Application, the present invention results in a considerable reduction in the catalyst mass. The present invention, moreover, prevents the occurrences of undesirable leakages, as have been heretofore unavoidable with a regenerative gas preheater positioned between the streams of cold, uncleaned and warm cleaned flue gas, since preheating and cooling of the flue gas according to the present invention take place within the heat exchanger and by means of separately movable heat storage elements. Additionally, the present invention provides for structural simplifications since all process steps are performed in a uniform, closed heat exchanger and reaction housing.

BRIEF DESCRIPTION OF THE DRAWING

Further objects and advantages of the present invention and the structure and operation of the inventive apparatus and method will become apparent to those skilled in the art of flue gas treatment from the following detailed descriptions taken in conjunction with the sole drawing FIGURE which is a schematic longitudinal section of an apparatus for catalytically reducing noxious substances in flue gas.

DESCRIPTION OF THE PREFERRED EMBODIMENTS

The sole drawing FIGURE shows a heat exchanger in the form of a heat exchanger housing 1 which, functionally speaking, is subdivided into four sections, namely, a bottom section 1.1, a first middle section 1.2, a second middle section 1.3, and a top section 1.4. The heat exchanger housing 1 incudes a chute for receiving and circulating heat storage elements 2 which are separately movable, e.g. spheres, with the chute being formed of gas permeable inner walls 1a and three housing constrictions 1b, 1c and 1d.

The bottom section 1.1 of the chute is provided with a connecting pipe 5 for the introduction of the flue gas stream 6 to be treated which comes from a desulfurization system 3 in which it was cooled. The top section 1.4 is provided with a connecting pipe 7 from which the flue gas stream 6, which has been freed of noxious substances, such as, $NO_x$ and $SO_x$, is introduced into a chimney 4. At least some of heat storage elements 2 are provided with a catalyst coating capable of catalyzing the reduction of noxious substances contained in the flue gas stream 6 as the heat storage elements are passed through the chute from the top section 1.4 to the bottom section 1.1. The heat storage elements 2 which are provided with the catalyst coating are divided into a plurality of groups, the groups differing from one another in at least one significant characteristic, such as a significant physical characteristic including size, shape, or weight, on the basis of which the groups can be separated from one another.

Below bottom section 1.1, heat storage elements 2 reach a discharge station 9 which is equipped with a cleaning device 10 and a discharge device 10a for removing residual dust and abrasion products, and a sorting device 11 which includes grates 11a. The various groups of heat storage elements 2 are separated from one another in sorting device 11, for example, by size. Sorting device 11 is provided with discharge fittings 12.1 through 12.n, where n is a positive finite number which ranges up to a number corresponding to the number of groups of heat storage elements 2. Discharge fittings 12.1 through 12.n make it possible to remove respective desired groups of heat storage elements 2. The remaining heat storage elements 2 are transported to the top section 1.4 by a circulating device 13 and a filling device 15 returns them to heat exchanger housing 1 at a point above top section 1.4. The heat storage elements 2 of a certain group, e.g., of a certain size, that are removed at a specific one of discharge fittings 12.1 through 12.n, are replaced by new or regenerated heat storage elements 2 of another group, e.g., of a different size, by charging replacement or regenerated heat storage elements 2 into filling device 16 positioned above top section 1.4.

The cooled flue gas stream 6 coming from desulfurization system 3 is initially conducted transversely through the chute in bottom section 1.1 and is thus preheated by heat storage elements 2 passing downwardly therethrough, to a temperature ranging, e.g., from 50° C. to 250° C. On the side of the lower section 1.1 of the chute which is opposite connecting pipe 5, flue gas stream 6 is heated to a predetermined reaction temperature as required for catalytical reduction of noxious substances, e.g., 350° C., by means of an external heating device 14 and is deflected upwardly through the heat exchange housing 1 from bottom section 1.1 to first middle section 1.2.

Then, a dosaging device 8a introduces ammonia into the heated flue gas stream 6 in first middle section 1.2. Flue gas stream 6 is conducted transversely through first middle section 1.2 of the chute, wherein a portion of the noxious substances, particularly $NO_x$, is catalytically reduced.

In the second middle section 1.3, more ammonia is introduced into the heated flue gas stream 6 as it is conducted transversely through second middle section 1.3. Ammonia is added by means of a second dosaging device 8b and remaining portions of the noxious substances are catalytically reduced.

The heat storage elements 2 passing through top section 1.4 are relatively cold compared to those passing through sections 1.3, 1.2 and 1.1, respectively, such that, the flue gas stream 6 is cooled to about 80° C. by the relatively cold heat storage elements 2 in this section and is introduced into chimney 4 through connecting pipe 7.

The intake to chimney 4 is equipped with a measuring station M which monitors any residual noxious substances, including ammonia, still present in the flue gas stream 6. If the residual content of noxious substances and/or ammonia increases, this indicates that catalyst-coated heat storage elements 2 are spent and must be removed and replaced by new or regenerated catalyst-coated heat storage elements. The removal and replacement process can also be regulated in response to the noxious substance concentrations of the flue gas stream 6 as it leaves the desulfurization system 3 and is conducted into connecting pipe 5 of the heat exchanger housing 1.

Constrictions 1b, 1c, 1d have dimensions selected so that the flue gas stream 6 passing through the chute on a short-circuited path has a period of dwell which is the same as that of the flow gas stream 6 flowing transversely through the chute.

For operation under partial loading and during start-up and shut-down of the entire system, it is advisable to provide a bypass 17 equipped with a blocking and regulating flap 18 so that flue gas stream 6 circumvents the heat exchanger housing 1.

The present disclosure relates to the subject matter disclosed in Federal Republic of Germany Patent Application No. P 36 37 871.2-43, filed Nov. 6th, 1986, the entire specification of which is incorporated herein by reference.

It will be understood that the above description of the present invention is susceptible to various modifications, changes and adaptations, and the same are intended to be comprehended within the meaning and range of equivalents of the appended claims.

What is claimed is:

1. A process for catalytically reducing noxious substances contained in flue gas, the process comprising:
   a. passing a plurality of heat storage elements which are separately movable in a direction of passage through a top section, at least one middle section, and a bottom section of a heat exchanger, in the order recited, at least a portion of the plurality of heat storage elements being provided with a catalyst coating and being divided into a plurality of groups, each group of the plurality of groups differing from other groups of the plurality of groups in at least one significant characteristic on the basis of which the plurality of groups may be separated from one another;
   b. passing flue gas through the heat exchanger in a direction which is transverse to the direction of passage of the heat storage elements by
      (i) first, conducting the flue gas discharged from and cooled within a desulfurization system through the bottom section of the heat exchanger to preheat the flue gas by contact thereof with the plurality of heat storage elements and to bring the flue gas to a reaction temperature effective for the catalytic reduction of noxious substances by means of an external heating means;
      (ii) second, adding ammonia to the flue gas and conducting the flue gas through the at least one middle section of the heat exchanger at least once for catalytic reduction of the noxious substances;
      (iii) third, conducting the flue gas through the top section of the heat exchanger to cool the flue gas to a chimney entrance temperature; and
   c. removing the plurality of heat storage elements from the bottom portion of the heat exchanger and reintroducing the plurality of heat storage elements into the top section of the heat exchanger, wherein the removing step includes disposing of at least one spent group of the plurality of groups of heat storage elements and substituting therefor at least one different and unspent or regenerated group of the plurality of groups of heat storage elements.

2. The process according to claim 1, wherein the at least one significant characteristic is at least one physical characteristic selected from size, shape and weight.

3. The process according to claim 1, wherein the disposing of at least one spent group and substituting therefor at least one different and unspent or regenerated group is initiated by measuring noxious substance concentrations of the flue gas exiting the top seciton of the heat exchanger and causing disposing and substituting when the noxious substance concentrations exceed specified noxious substance concentrations.

4. The process according to claim 3, wherein the noxious substance concentrations measured include the concentration of $NO_x$ and $NH_3$.

5. The process according to claim 1, wherein the removing step includes sorting the plurality of heat storage elements exiting the bottom section of the heat exchanger in a sorting means to separate the plurality of groups from one another on the basis of the at least one significant characteristic.

6. The process according to claim 1, further comprising
   cleaning the plurality of heat storage elements removed from the bottom portion of the heat exchanger to remove dust and abrasion products therefrom.

* * * * *